United States Patent

Watanabe

Patent Number: 5,193,019
Date of Patent: *Mar. 9, 1993

[54] METHOD OF MANUFACTURING LIQUID CRYSTAL DEVICES

[75] Inventor: Toshio Watanabe, Atsugi, Japan

[73] Assignee: Semiconductor Energy Laboratory Co., Ltd., Kanagawa, Japan

[*] Notice: The portion of the term of this patent subsequent to Apr. 17, 2007 has been disclaimed.

[21] Appl. No.: 704,022

[22] Filed: May 22, 1991

Related U.S. Application Data

[60] Continuation-in-part of Ser. No. 466,961, Jan. 18, 1990, abandoned, which is a division of Ser. No. 254,096, Oct. 6, 1988, Pat. No. 4,917,473.

[30] Foreign Application Priority Data

Oct. 13, 1987 [JP] Japan ............................. 62-257899
Oct. 13, 1987 [JP] Japan ............................. 62-257900

[51] Int. Cl.$^5$ .............. G02F 1/1335; G02F 1/1339; G02F 1/137
[52] U.S. Cl. ........................... 359/62; 359/80; 359/90
[58] Field of Search .............. 359/62, 43, 80, 86, 359/90

[56] References Cited

U.S. PATENT DOCUMENTS

| | | | |
|---|---|---|---|
| 4,586,791 | 5/1986 | Isogai et al. | 359/104 |
| 4,721,367 | 1/1988 | Yoshinaga et al. | 359/104 |
| 4,917,473 | 4/1990 | Watanabe | 359/80 |
| 4,976,516 | 12/1990 | Carrington | 359/62 |

FOREIGN PATENT DOCUMENTS

| | | | |
|---|---|---|---|
| 0237027 | 10/1988 | Japan | 359/62 |
| 0256922 | 10/1988 | Japan | 359/62 |
| 0055518 | 3/1989 | Japan | 359/62 |
| 0300223 | 12/1989 | Japan | 359/62 |
| 2-08624 | 8/1990 | Japan | 359/62 |

*Primary Examiner*—William L. Sikes
*Assistant Examiner*—Anita P. Gross
*Attorney, Agent, or Firm*—Sixbey, Friedman, Leedom & Ferguson

[57] ABSTRACT

An improved method for manufacturing liquid crystal device is described. The method comprises mating a pair of substrates with an inner space therebetween, sealing the periphery of the mated substrates except for inlet ports, placing the mated substrates in a vacuum chamber, evacuating air from the inner space between the substrates by virtue of the differential pressure between the inner space and the vacuum chamber, pouring a liquid crystal material into the inlet ports, introducing the liquid crystal material into the inner space by elevating the pressure of the vacuum chamber at an elevated temperature, cooling the liquid crystal material, and closing the inlet ports by means of a sealing member. The removal of the superfluous portion of the liquid crystal material is done only after closing of the inlet ports.

3 Claims, 2 Drawing Sheets

FIG. I(A)
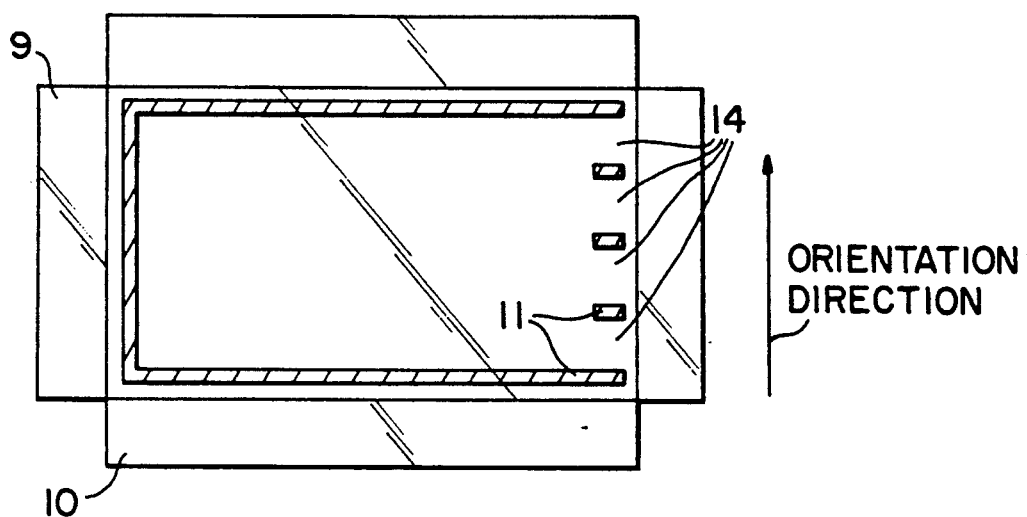
ORIENTATION DIRECTION
FIG. I(B)
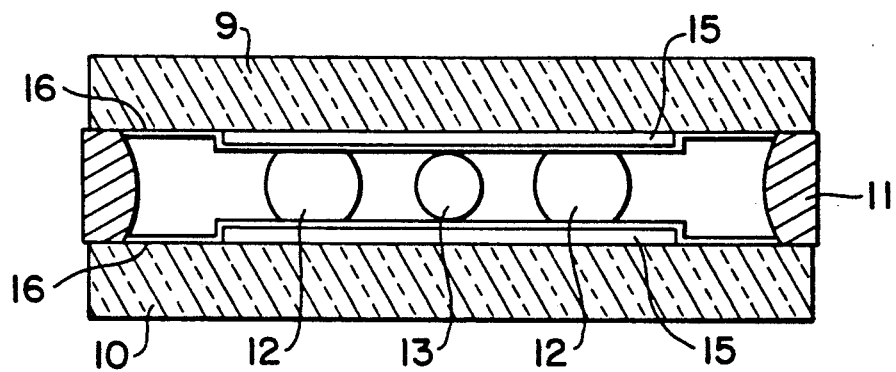

METHOD OF MANUFACTURING LIQUID CRYSTAL DEVICES

BACKGROUND OF THE INVENTION

This application is a continuation-in-part application of U.S. application Ser. No. 466,961 filed Jan. 18, 1990 now abandoned which is a divisional application of U.S. application Ser. No. 07/254,096 filed Oct. 6, 1988 which has issued U.S. Pat. No. 4,917,473 on Apr. 17, 1990.

The present invention relates to a method of manufacturing liquid crystal devices.

Liquid crystal displays have been broadly applied to personal computers, wordprocessors, and other such devices. Liquid crystals mainly used in such devices are twisted nematic type materials. On the other hand, liquid crystal material exhibiting smectic A and chiral smectic C phases are attracting interest of researchers because of new type driving modes.

In case of smectic phases, it is likely that external forces or impacts likely cause disturbance in the molecular arrangement of the liquid crystal. Unevenness of the cell thickness produces color shade in the display driven in accordance with the birefringence mode. The provision of spacers are used for fixing a pair of substrates at intermediate positions in order to deal with these problems.

The distance between a pair of substrates has to be chosen so as to unwind molecular spirals formed in the chiral smectic C liquid crystal layer disposed between the substrates. In order to dispose a liquid crystal material, the mated substrates are placed in a vacuum chamber and the pressure is reduced so that the air present in the inner space between the substrates is evacuated therefrom. Then, after an amount of the liquid crystal material is poured to an inlet port provided at a peripheral position of the mated pair of substrates, the pressure in the vacuum chamber is elevated in order to introduce the liquid crystal material into the inner space at an elevated temperature at which the phase of liquid crystal material exhibits a low coefficient of viscosity. Finally, the inlet port is closed by a suitable sealing material. However, in accordance with this conventional method, void spaces may be produced in the liquid crystal layer due to thermal contraction and therefore the yield of product is substantially reduced.

SUMMARY OF THE INVENTION

It is an object of the present invention to provide a method of manufacturing a variety of liquid crystal devices without causing void spaces in the liquid crystal layer between a pair of substrates.

It is another object of the present invention to provide a method of manufacturing liquid crystal devices which can be driven without causing color shade due to unevenness of the thickness of the liquid crystal layer interposed between the pair of substrates.

In order to accomplish the above and other objects, an amount of liquid crystal material is introduced into the space between a pair of glass substrates through inlet ports, and the temperature is gradually descended in advance of sealing off of the inlet ports. The cooling speed is determined depending on the kind of liquid crystal material and the dimension of the inlet ports. It is to be noted that the present invention is directed to various types of liquid crystal devices such as FLC, STN, TN and PD liquid crystal cells and the like.

BRIEF DESCRIPTION OF THE DRAWINGS

FIGS. 1A and 1B are perspective and cross-sectional views of a liquid crystal device of intermediate production condition prior to introduction of liquid crystal material in accordance with the present invention.

DETAILED DESCRIPTION OF THE PREFERRED EMBODIMENTS

Figure 2:
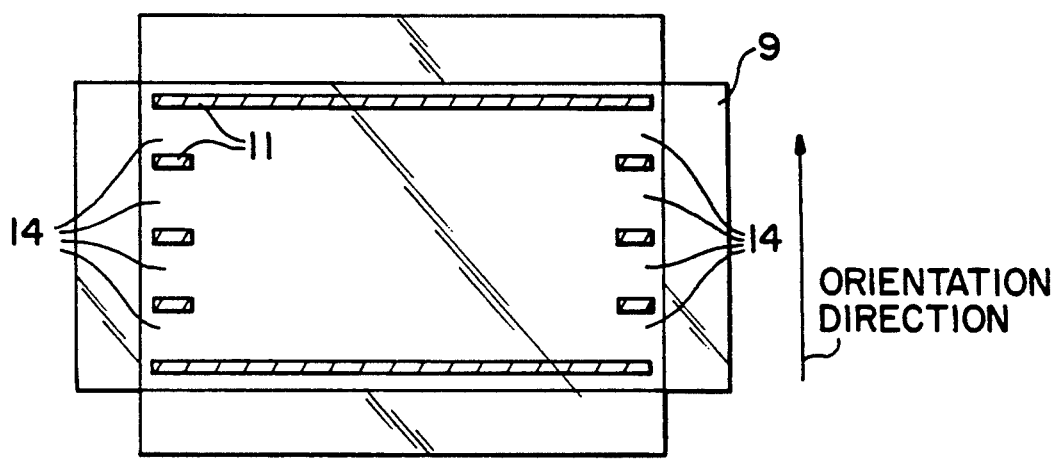
FIG. 2 is a perspective view showing a modification of the liquid crystal device blank shown in FIGS. 1A and 1B.

Referring now to FIGS. 1A and 1B, a method of manufacturing a liquid crystal device in accordance with the present invention is described. The present invention is directed to various types of liquid crystal devices such as FLC, STN, TN an PD liquid crystal cells, and the like. The device comprises a pair of glass substrates 9 and 10, a pair of temperature electrode arrangements 15 formed in the inside surfaces of the substrates, a pair of orientation control films 16 formed on the opposed insides of the substrates 9 and 10, spacers 13 controlling the distance between the substrates, adhesive resin members 12 fixing the substrates and a sealing member 11 provided on the periphery of the substrates for avoiding loss of liquid crystal material. A plurality of inlet ports 14 are formed at the right edge of the substrate where provision of the sealing member is partially omitted. The orientation control film is given rubbing treatment in the vertical direction as shown by an arrow. The orientation control films help homogeneous alignment of the liquid crystal molecules.

The liquid crystal device structure of such an intermediate product condition is placed in a vacuum chamber and the pressure is reduced to $6 \times 10^{-3}$ Torr. Then, the amount of a C liquid crystal material or the like is poured by means of a dispenser to close the inlet ports at an elevated temperature at which the liquid crystal is in a nematic or isotropic phase. The phase of the liquid crystal material is chiral smectic C at the operation temperature of the device. In this condition, the pressure in the vacuum chamber is returned to an atmospheric pressure in order to fill the space between the substrates with the liquid crystal material by virtue of the differential pressure between the inside and the outside of the liquid crystal device. The structure is then removed from the chamber and placed in a constant temperature bath with the liquid crystal material remaining in the vicinity of the inlet ports as it is. The temperature of the structure is descended uniformly to 0° C. at a cooling rate of −5° C./hour. After 0° C. is reached, an ultraviolet curable epoxy resin adhesive is applied to the inlet ports in order to close them followed by eliminating the liquid crystal material present outside of the device. Crossed Nicols may be provided on the external surfaces of the structure if necessary. Alternatively, the inlet ports may be formed not only at the right side but also at the left side as shown in FIG. 2.

Figure 3:
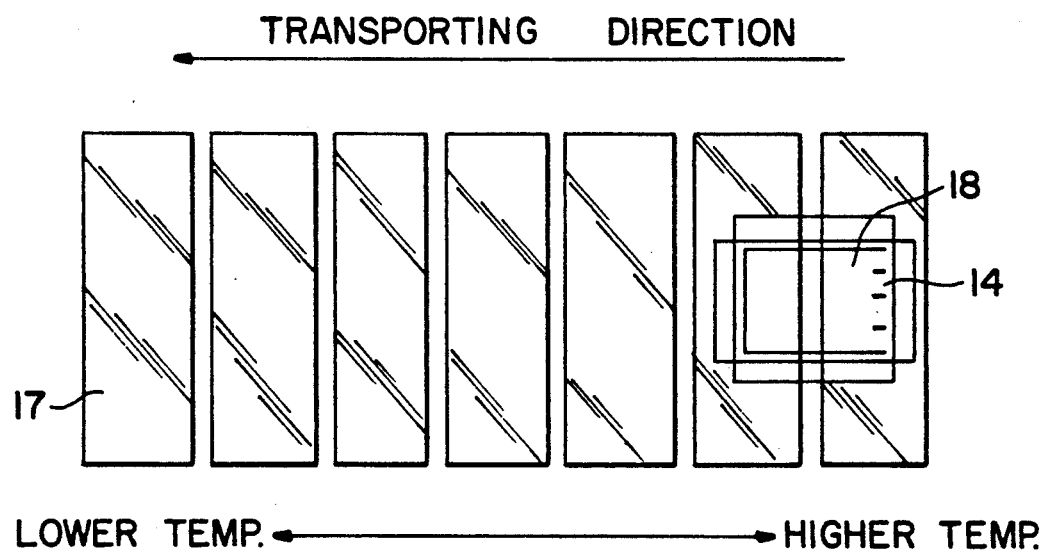
FIG. 3 is a plan view showing a temperature control device utilized in accordance with the present invention.

The cooling operation of the structure can be performed by the use of an apparatus illustrated in FIG. 3. The apparatus comprises a plurality of constant temperature plates 17, the temperatures of which are elevated from the leftmost plate to the rightmost plate. The structure as shown in FIGS. 1A and 1B containing the liquid crystal material therein is mounted on the apparatus and conveyed in the left direction that is, in the temperature decreasing direction, with the inlet ports at the head. After the temperature of the liquid crystal falls to 0° C., the inlet port is sealed off as previously described.

While several embodiments have been specifically described, it is to be appreciated that the present invention is not limited to the particular examples described and that modifications and variations can be made without departure from the scope of the invention as defined by the append claims.

I claim:

1. A method of disposing a liquid crystal material between a pair of substrates comprising:
   forming an electrode arrangement on the inside surfaces of said pair of substrates;
   coating an orientation control film on the inside surface of at least one of said substrates;
   giving orientation treatment to said orientation control film;
   mating said pair of substrates with an inner space therebetween;
   sealing the periphery of the mated substrates except for at least one inlet port;
   placing the sealed substrates in a vacuum chamber;
   descending the pressure in said vacuum chamber;
   pouring said liquid crystal material into said inlet port such that said liquid crystal material is kept in its nematic or isotropic phase;
   elevating the pressure in said vacuum chamber in order to introduce said liquid crystal material into said inner space;
   descending the temperature of said liquid crystal material between said substrates below a temperature at which said liquid crystal material is driven;
   sealing off said inlet port in order to avoid loss of said liquid crystal material contained in the inner space, said sealing occurring while said liquid crystal is substantially at the descended temperature; and
   removing the remaining portion of said liquid crystal material from the vicinity of said inlet port.

2. A method of disposing a liquid crystal material between a pair of substrates comprising the steps of:
   placing a pair of substrates in a vacuum chamber, said pair of substrates facing with each other having a space therebetween and being provided with at least one inlet port for a liquid crystal material;
   evacuating said vacuum chamber;
   placing said liquid crystal material on said inlet port, wherein said liquid crystal material is kept at a temperature at which said material is in its isotropic or nematic phase;
   increasing a pressure in said vacuum chamber in order to introduce said liquid crystal material into the space between the substrates from the inlet port;
   decreasing the temperature of the liquid crystal material within said space to a temperature below an operating temperature of said liquid crystal; and
   sealing the inlet port at said decreased temperature.

3. A method of disposing a liquid crystal material between a pair of substrates comprising the steps of:
   placing a pair of substrates in a vacuum chamber, said pair of substrates facing each other having a space therebetween and being provided with at least one inlet port for a liquid crystal material;
   evacuating said vacuum chamber;
   placing said liquid crystal material at said inlet port, wherein said liquid crystal material is kept at a temperature at which said material is in its isotropic or nematic phase;
   increasing a pressure in said vacuum chamber in order to introduce said liquid crystal material into the space between the substrates from the inlet port;
   decreasing the temperature of the liquid crystal material within said space to a temperature below an operating temperature of said liquid crystal material, wherein a temperature of the liquid crystal material around the inlet port is kept higher than that of the other portion of the substrates; and
   sealing the inlet port at said decreased temperature.

* * * * *